Nov. 21, 1961     V. O. HAUSWIRTH ET AL     3,009,306
SIDE DELIVERY RAKE
Filed Aug. 20, 1958     5 Sheets-Sheet 3
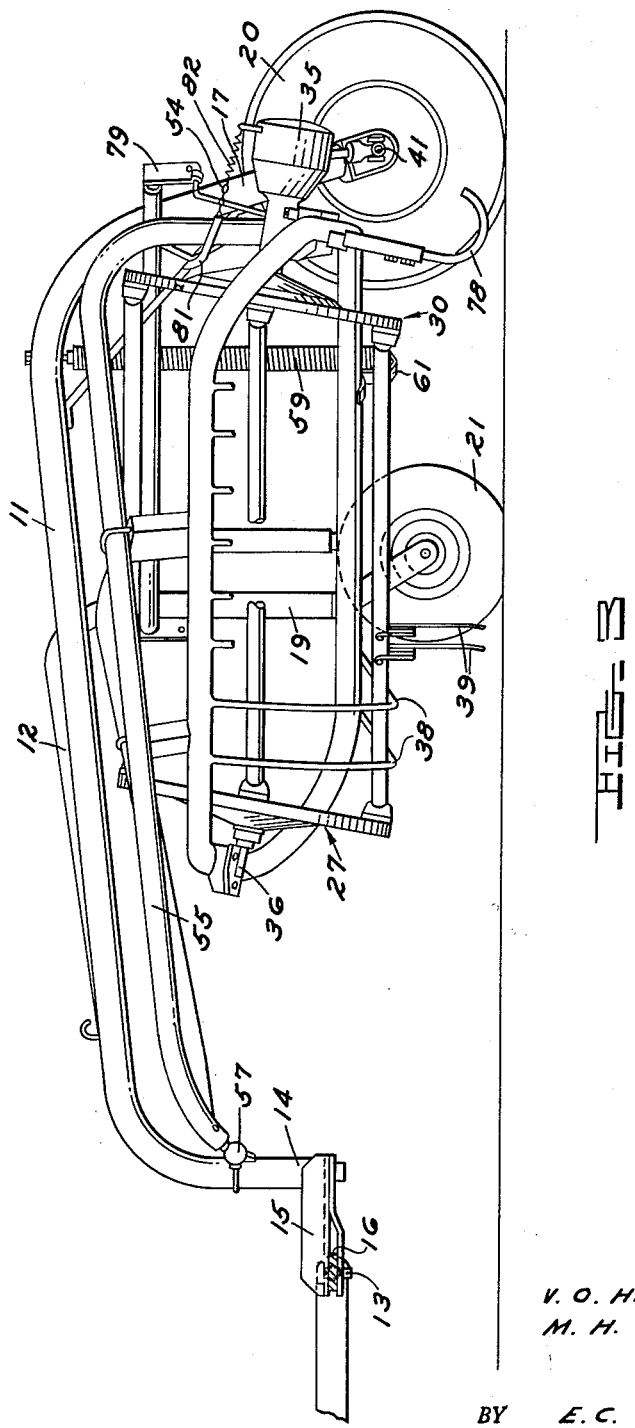
V. O. HAUSWIRTH
M. H. TUFT
        INVENTORS
BY    E. C. McRAE
       P. F. HILDER
          ATTORNEYS

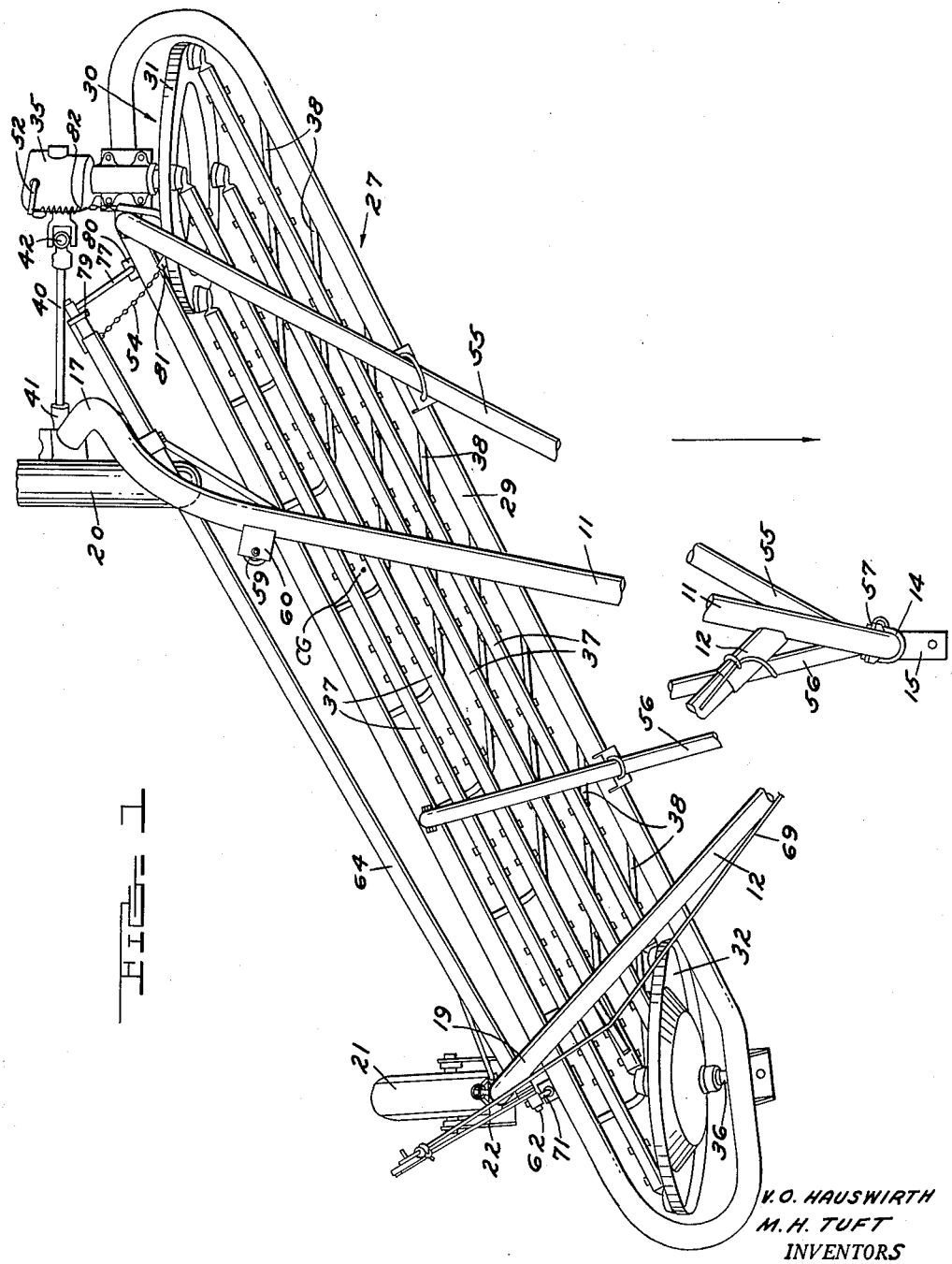

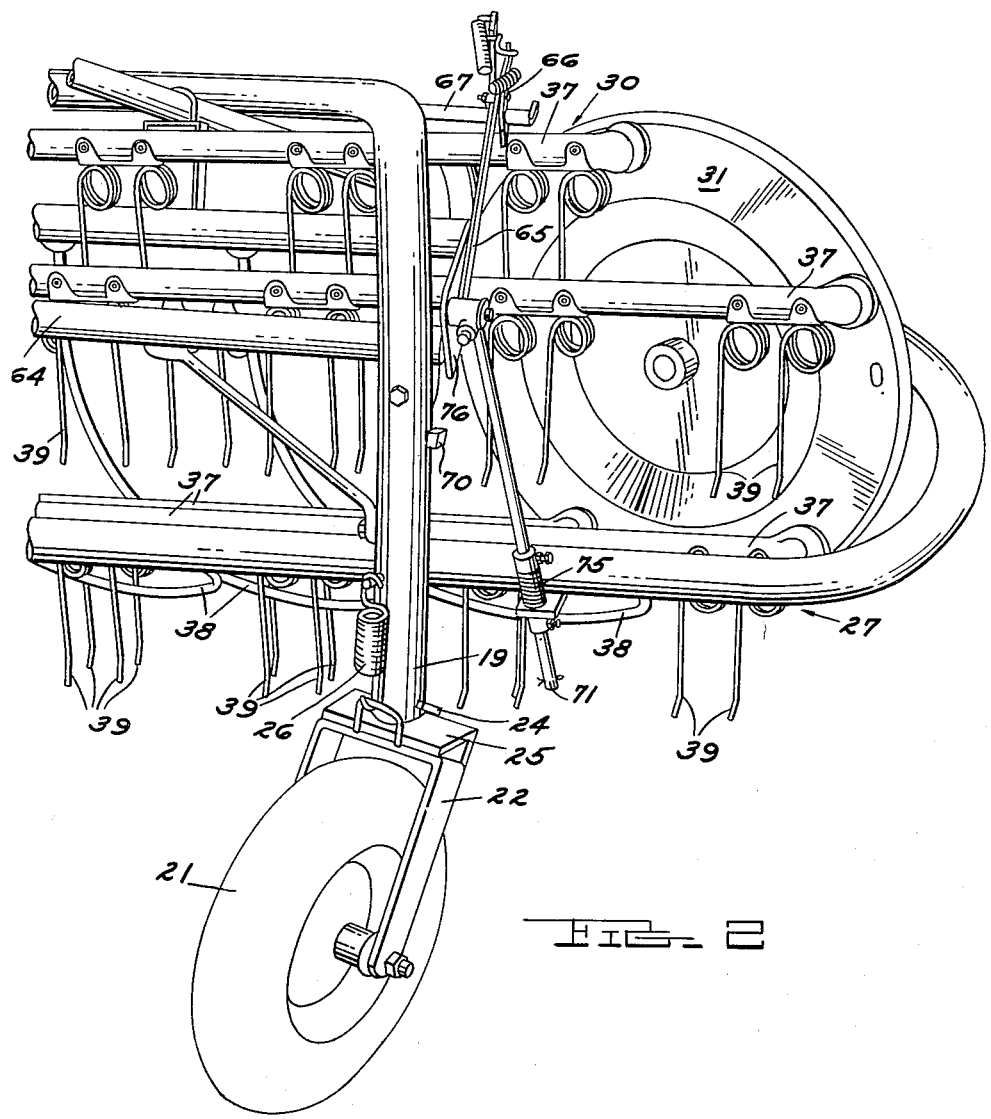

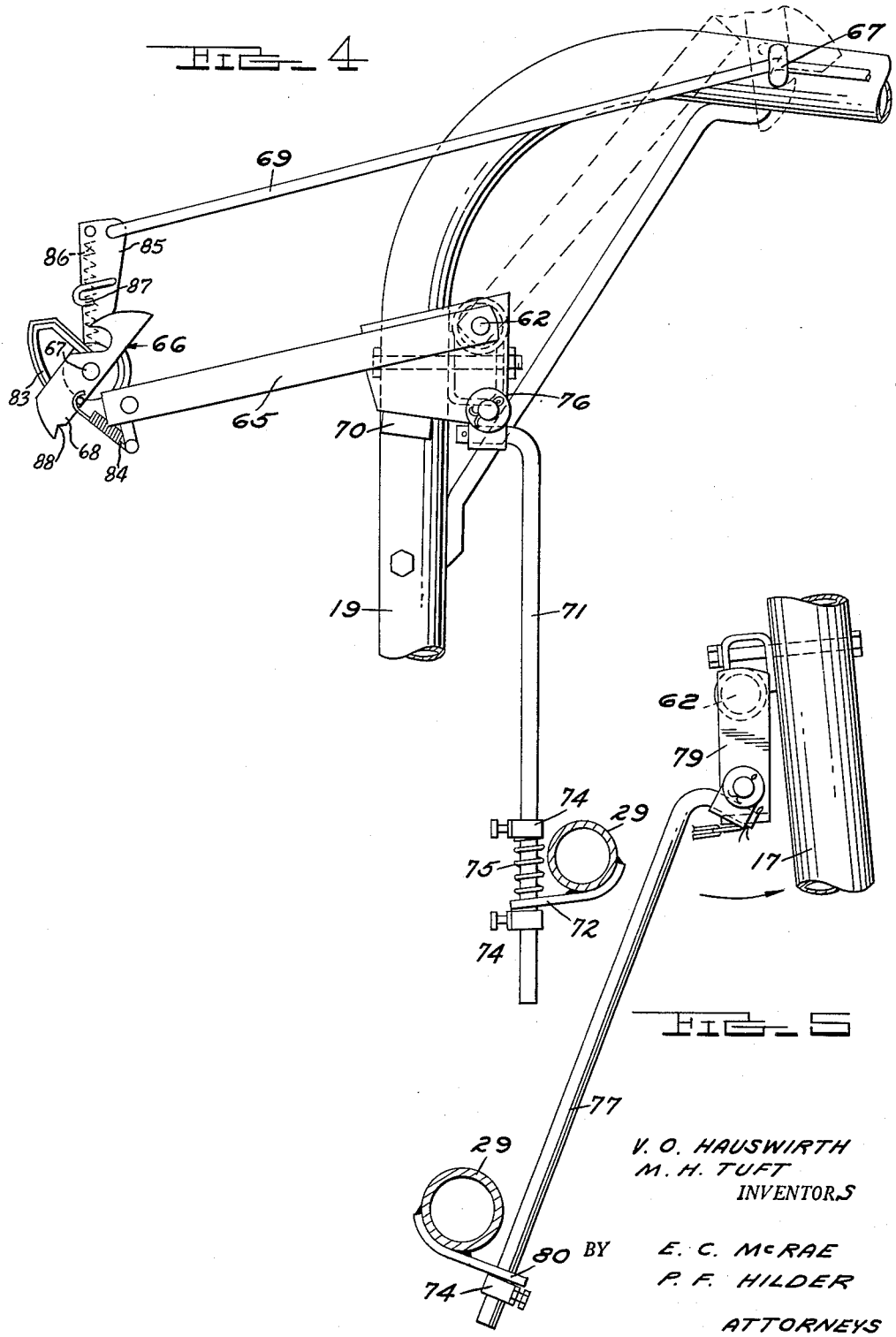

United States Patent Office 3,009,306
Patented Nov. 21, 1961

3,009,306
SIDE DELIVERY RAKE
Vernon O. Hauswirth, Berkeley, and Miles H. Tuft, Birmingham, Mich., assignors to Ford Motor Company, Dearborn, Mich., a corporation of Delaware
Filed Aug. 20, 1958, Ser. No. 756,217
6 Claims. (Cl. 56—377)

This invention relates to side delivery rakes.

Side delivery rakes often are towed behind tractors for the purpose of raking into windrows hay that previously has been mowed. Such rakes consist essentially of a raking reel formed of a pair of rotatably-mounted reel plates connected by a plurality of rake bars provided with downwardly projecting spring tines, the reel being driven by a ground wheel or by the tractor power take-off shaft. The reel extends obliquely to the line of draft of the rake and sweeps the hay to one side to form a windrow as the rake moves forwardly across a mowed field. Raking reels may have the axes of the reel plates on a single common axis, but preferably have the axes of the reels offset, the reel being generally cylindroidal, as indicated in the drawings, and the tines moving in a series of parallel transverse planes.

The rake shown and described in the specific embodiment of the present invention is of the ground driven type and has a raking reel assembly spring-suspended for floating action. The position of the ground wheels, together with the spring suspension of the raking reel permits the reel to follow closely the contour of the ground, while the reel lift mechanism and reel drive stabilize the reel assembly against bounce and maintain traction on a single ground drive wheel.

The reel assembly is stabilized against side movement by a fixed length drive shaft extending laterally between the ground drive wheel and a gear box mounted on the reel frame to drive the reel, the drive shaft being under compression. This construction further aids in holding the right end of the rake against bouncing on rough ground. A further feature of the invention is the tilting of the axes of the reel plates so that the axes are inclined forwardly upwardly, preferably at an angle of about ten degrees to the horizontal, thereby reducing the angularity of the universal joints in the ground wheel drive and facilitating entrance of the tines between the stripper bars of the reel assembly.

Among the objects of the present invention are to provide an improved side delivery rake in which the reel assembly is spring-mounted for floating movement to follow more closely the contour of the ground; to provide such a rake in which the reel assembly is stabilized against bounce and side movement; to provide such a rake in which the forces acting on the rake are utilized to place most of the weight of the rake on a single ground-driven wheel while maintaining a second supporting wheel in contact with the ground; and generally to improve rakes of the type described.

Other objects and objects relating to details of manufacture and use will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguised from the pertinent prior art. The best form in which we have contemplated applying our ivention is illustrated in the accompanying drawings forming part of this specification in which:

FIGURE 1 is a top plan view of a rake constructed according to the present invention, intermediate portions of the main frame and reel support arms being broken away for convenience of illustration.

FIGURE 2 is an enlarged rear perspective view of the right end of the rake of FIGURE 1.

FIGURE 3 is a left side elevation of the rake of FIGURE 1, the rake being shown hitched to the drawbar of a tractor and portions of certain of the parts being broken away for convenience of illustration.

FIGURE 4 is a somewhat diagrammatic, enlarged view of the right rear portion of the main frame, showing portions of the reel lift mechanism including the latch and the right lift rod.

FIGURE 5 is a somewhat diagrammatic view of a portion of the left frame member, showing portions of the reel lift mechanism including the left lift rod.

Figure 6:
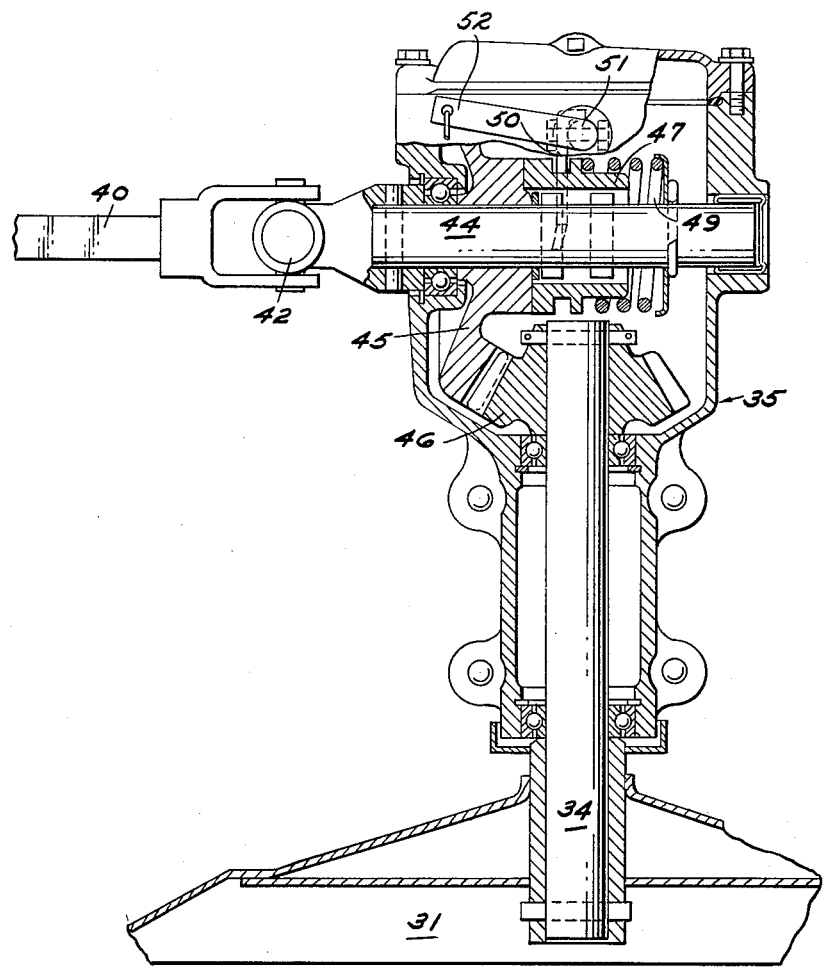
FIGURE 6 is a cross section of the right-angle-drive gear box for driving the raking wheel, taken generally on the axis of the input and output shafts portions of certain of the parts being broken away for convenience of illustration.

The side delivery rake shown in the drawings is of the ground-drive, pull-behind type in which a V-type main frame is formed of two forwardly converging lengths of pipe consisting of a left frame member 11 and a right frame member 12, the designations "left" and "right" as used throughout this description relating to the rake as viewed when facing in the direction of travel thereof.

The left frame member 11 extends generally fore and aft of the rake, and the forward end 14 of this member extends generally vertically downward at the apex of the frame. A tractor hitch 15 of any usual design extends forwardly from the lower end of the portion 14 of the frame member and is adapted to be connected to a tractor drawbar 16 by a customary vertical pin 13.

The frame members 11 and 12 extend rearwardly at a slight upward inclination as indicated in FIGURE 2 and the rear ends or terminal portions 17 and 19 respectively, of the members 11 and 12 extend downwardly, each having a ground wheel mounted thereon and the rake having a three-point support consisting of the pair of ground wheels and the tractor hitch 15. The ground wheel 20 supported at the rear end 17 of the left frame 11 is a ground-drive wheel, is supported on a rigid transverse axis, and drives the raking reel by a drive mechanism to be described. The ground wheel 21 mounted at the rear end 19 of the right frame member 12 is mounted within a fork 22 mounted for rotation on a vertical axis within the end of the frame member. Preferably, the rear end 19 of the right frame member is provided with an inclined cam surface 24 immediately above the fork 22 which is flat and extends transversely of the rake.

A cam follower 25 mounted on the fork 22 and reinforcing the top portion thereof contacts the cam surface 24 and a tension spring 26 extending between the fork 22 and the rear end 19 of the frame member biases the fork 22 upwardly on its axis. The organization of parts is such that the wheel 21 is biased by the spring 26 and the cam surface 24 into a straight-ahead position in which the axis of the wheel is behind the axis of the fork 22. However, should the wheel 21 encounter an obstruction tending to deflect it, the fork 22 will be turned on its axis, forcing the fork downwardly by interaction of the cam surface 24 and cam follower 25 and stretching the spring 26 so as to allow the wheel to deflect temporarily from a straight-ahead position and thus avoid bending or breaking the wheel or associated parts. Further, in backing the rake, the above-described mechanism prevents swiveling of the fork 22 as in a caster wheel.

The ground wheel 21 is much smaller in diameter than the ground wheel 20 and, therefore, may be mounted closer to the raking reel assembly, to be described, thereby permitting the reel assembly to more closely follow the contour of the ground. The ground wheel 20 is located close to the center of gravity of the rake, as will be described, and, therefore, the ground wheel 20 will support most of the load of the rake, the load on the ground wheel 21 being relatively light. Inasmuch as the raking reel is driven from the ground wheel 20, such an arrangement gives additional traction on the driving wheel, making it unnecessary to drive the reel from both wheels as in most conventional rake constructions.

The raking reel frame assembly 27 includes a reel frame 29 surrounding and supporting a raking reel 30. The reel frame 29 preferably is an endless frame formed of pipe bent and fabricated to the shape shown in the drawings, the frame extending obliquely to the line of draft of the rake, indicated by the arrow in FIGURE 1. The reel frame 29 lies generally in a single plane which is forwardly upwardly inclined about an axis extending obliquely to the line of draft of the rake.

A pair of reel plates 31 and 32 are rotatably mounted on the reel frame 29 adjacent to its ends, the reel plates 31 and 32 facing each other but the axes of rotation of the plates being laterally offset. Preferably, the axes of the reel plates 31 and 32 also are vertically offset, lying in parallel vertical planes extending in the direction of draft of the rake and the axes being forwardly upwardly inclined from the horizontal at an angle of about ten degrees. The advantages of such construction will be explained in connection with the detailed description to follow.

The reel plate 31 is fixed to an axial shaft 34 which is the output shaft of a right-angle-drive gear box 35 to be described, the reel plate 31 being the driven reel plate and the reel plate 32 being the idler plate. The reel plate 32 is supported from the reel frame 29 by a shaft 36 mounted on the under side of the frame.

The reel plates 31 and 32 are connected by a plurality of parallel rake bars 37, and rake bars extending obliquely between the planes of the reel plates and being rotatably mounted at uniformly-spaced intervals about the periphery of the reel plates for rotation on axes parallel to the axes of the reel plates. The rake bars 37 form the sole driving connection between the reel plates 31 and 32 and cause the idler reel plate 32 to be rotated by the driven reel plate 31. Spring tines 39 project downwardly from the rake bars at intervals, each of the rake bars 37 being identical and having identically-spaced tines. As the raking reel, comprising the reel plates 31 and 32 and the rake bars 37 are rotated, each tine 39 is rotated through the path of a circle the same diameter as, and lying in a plane parallel to, the circle described by the ends of the tine bars. Inasmuch as the axes of the reel plates 31 and 32 extend generally in the direction of the line of draft of the rake, the paths of the tines 39 will lie in planes perpendicular to the reel plate axes and the tines at the bottom of their circular travel are moving principally in a direction laterally to the left so as to rake to the left.

Strippers 38 extend between the front and back sides of the reel frame 29, the strippers being formed of steel rods extending generally parallel to the lower portion of the path of travel of the tines 39 and at a level adjacent the upper portions of the tines. The tines enter between the strippers adjacent the rear side of the reel frame 29 and are withdrawn from between the strippers adjacent the front side of the reel frame, thereby removing any hay that may tend to be carried upwardly with the tines.

The reel plate 31 of the raking reel is driven from the ground wheel 20 through a fixed length drive shaft 40 and universal joints 41 and 42 located at the ends of the drive shaft. Referring to FIGURE 6, the universal joint 42 is mounted on an input shaft 44 extending within the right-angle-drive gear box 35 which, driving through a pair of bevel gears 45 and 46, drives the output shaft 34 to which the reel plate 31 is fixed. The gear box 35 is mounted on the left end of the reel frame 29, as indicated in the drawings.

A jaw-type clutch within the right-angle-drive gear box 35 permits connecting and disconnecting the drive from the ground wheel 20 to the raking reel 30. This clutch consists of a clutch element 47 which rotates with the shaft 44 and is slidable therealong. The element 47 is pressed by a clutch spring 49 into engagement with the hub of the bevel gear 45, the bevel gear being free to turn on the shaft 44 when not engaged by the clutch element and turning with the shaft and element when the clutch is engaged. A clutch throw-out lever 50 fixed to a shaft 51 within the gear box 35 serves to move the element 47 against the bias of the spring 49 to a position of engagement with the hub of the bevel gear 45 to disengage the clutch. The clutch throwout lever 50 is operated by a chain 54 connected to a lever 52 on the shaft 51 outside the gear box, the chain being operated in a manner to be described.

The raking reel frame assembly 27 is connected with the forward end 14 of the main frame 10 by a pair of forwardly converging reel support arms 55 and 56, the rear portion of these arms being secured to the reel frame 29 by clamping or otherwise, preferably at both the front and rear sides of the frame. Preferably, the forward converging ends of the reel support arms are connected with the main frame 10 by a ball joint 57 to provide limited universal movement of the arms on the main frame. The left reel support arm 55 preferably connects with the reel frame 29 adjacent the right-angle-drive gear box 35 while the right reel support arm connects with the reel frame towards the other end thereof. These support arms transmit draft from the main frame 10 to the reel assembly 27 and stabilize the assembly without restricting its up and down movement or its lateral movement about the ball joint 57 as a center.

The reel assembly 27 is suspended from the main frame 10 by a flexible connection comprising a relatively large, low-rate, vertically-extending tension spring 59 which extends between a bracket 60 mounted on the left frame member 11 immediately behind the reel frame 29 and a bracket 61 mounted on the rear side of the reel frame. The spring 59 is located behind and very close to the center of gravity of the reel frame assembly 27 (marked C.G. FIGURE 1) and, when the assembly is lowered into operating position with the path of the tines 39 close to the ground, supports nearly all of the weight of the assembly. Due to the low rate of the spring 59, this spring provides a "floating" mounting for the assembly, very little force being required to raise either or both ends of the assembly a short distance.

The reel assembly 27 is raised into nonoperative position and lowered into operative position by a reel lift assembly including a transversely extending shaft 62 rotatably received within and projecting from the ends of a pipe 64 extending between the rear-end portions of the main frame members 11 and 12. The shaft 62 is oscillated through an angle of about 140 degrees by a lever 65. A latch 66 is mounted on the free end of the lever 65 and latches to a pin 67 projecting from the side of the right frame member 12 to hold the lever in the broken-line position indicated in FIGURE 4, which corresponds to raised position of the reel assembly. The lever 65 may be rotated to raise the reel assembly or released to lower the reel assembly by linkage to be described by pulling on a rope 69 connected with the latch 66 and controlled from the seat of the towing tractor. A stop 70 located on the right frame member 12 limits rotation of the lever 65 in a direction to lower the reel assembly 27.

The latch 66 includes a latch member 68 pivotally mounted on a cam plate 83 fixed to the end of the lever 65, and a spring 84 for biasing the latch 66 into latching position about the pin 67. A trip lever 85, mounted on the pin 67 mounting the latch member 68 and receiving the rope 69 is biased counterclockwise, as viewed in FIGURE 4, by a spring 86. Upon pulling the rope 69 to latch the latch member 68 on the pin 67 and then releasing the rope, the trip lever 85 will rotate counterclockwise so as to engage a hook member 87 mounted on the trip lever with a notch 88 on the latch member 68. Then, upon a second pull on the rope 69, the trip lever 85 and latch member 68 will be rotated clockwise as viewed in FIGURE 4 until the latch member is released from the pin 67, after which, upon release of the rope 69, the lever 65 will return to the full line position shown in FIGURE 4, lowering the rake for operation. After tension is released from rope 69, the latch member spring 84 will rotate the latch member 68 and trip lever 85 counterclockwise as viewed in FIGURE 4, whereupon engagement of the cam plate 83 with the hook member 87 will release the hook member from the notch 88 so as to reset the latch for latching action the next time the rope 69 is pulled forwardly.

A right reel lift rod 71 which extends generally vertically has its lower end received within a hole in a plate 72 secured to the rear side of the reel frame 29 adjacent its right end (see FIGURE 4). A collar 74 adjustable along the length of the rod 71 is located both above and below the plate 72, and a compression spring 75 extends between the upper collar 74 and the plate 72, the action of the collar and spring to be explained hereinafter.

The upper end of lift rod 71 is swivelled to the free end of a lever 76 fixed to the right end of the shaft 62, movement of the lever 65 to raise and lower the reel assembly 27 raising and lowering the rod 71. Preferably, the upper end of the rod 71 is mounted on the lever 76 by a connection permitting at least limited swinging of the rod 71 in a generally-vertical transverse plane.

The left end of the reel assembly 27 is suspended in a generally-similar manner by a left lift rod 77 (see FIGURE 5) which is swivelled to the end of a lever 79 fixed to the left end of the shaft 62. The lower end of the rod 77 is received within a hole in a plate 80 projecting from the rear side of the reel frame 29. A collar 74 adjustable along the length of the rod is located below the plate 80. Preferably, the plate 80 is located on the reel frame 29 close to the right-angle-drive gear box 35.

The clutch control chain 54 is connected to the outer end of the lever 79 and extends through a tubular guide 81 secured to the rear end portion of the reel support arm 55. Preferably, a tension spring 82 is interposed between the end of the chain 54 and the lever 52, the spring 82 being tensioned somewhat before sufficient pull is exerted to actuate the lever 52 to compress the spring 49 within the gear box and release the clutch, the spring 82 providing an elastic connection of the chain to the lever to keep the clutch disengaged in transport, but prevent excessive loads on the chain due to movement of the reel frame relative to the main frame.

When the lever 65 is latched in its forward position, the right and left lift rods 71 and 77 are raised, raising the reel assembly 27 to inoperative position for transport. At the same time, the drive to the raking reel is disengaged. Upon unlatching the lever 65 and permitting it to rotate rearwardly and downwardly against the stop 70, the lift rods 71 and 77 are lowered, permitting the reel assembly 27 to drop downwardly, stretching the spring 59, and also re-engaging the drive to the raking reel. Height of the ends of the raking reel may be adjusted by moving the collars 74 at the lower end of the lift rods upward or downward on the rods, these collars limiting downward movement of the reel assembly 27. Upward movement of the right end of the reel assembly 27 caused by either torque reaction of the reel drive or bouncing of the reel assembly is resisted by the spring 75 on the right lift rod 71. Lifting of the lift rod 71 due to rotation of the shaft 62 is resisted inasmuch as the pin connection between the lift rod and the lever 76 is rotated slightly past dead center, upward force of the spring 75 transmitted by the reel assembly serving merely to urge the lever 65 more tightly against the stop 70. Inasmuch as torque reaction of the reel drive tends to hold the left end of the reel assembly 27 down and raise the right-hand end of the assembly, it is unnecessary to provide a spring on the left lift rod 77 or to turn the pin connection between the lift rod and the lever 79 past dead center. Accordingly, the left-hand end of the reel is free to slide upwardly on the lift rod 77 to permit that end of the reel assembly to follow the contour of the ground.

Inasmuch as the lift rods 71 and 77 are free to swing laterally, lateral movement of the reel assembly 27 is resisted solely by the fixed-length drive shaft 36. Side draft from raking tending to force the reel assembly 27 to the right is resisted by compression in the shaft 36, which is transmitted to the center of the driving ground wheel 20 through the universal joint 41. This force, which acts on the right ground wheel 21 and associated parts in an opposite direction to the torque reaction of the reel drive, tends to maintain the lightly-loaded right ground wheel 21 in contact with the ground at all times and prevent bouncing of the right side of the rake. Inasmuch as these two forces are more or less proportional to raking effort, the forces tend to counteract each other and maintain a uniform loading on wheel 21.

A downwardly projecting skid 78 is provided on the left end of the reel frame 29, the skid terminating at about the level of the bottom of the paths of travel of the tines and supporting the reel assembly 27 by contact with the ground when traversing rough ground. This prevents the tines 39 from digging into the ground. No skid is provided at the right end of the reel assembly inasmuch as the ground wheel 21 is closer to the reel assembly and closer to the end of the reel than the wheel 20 and causes the right end of the assembly to more closely follow the contour of the ground.

As previously mentioned, the axes of the reel plates 31 and 32 preferably are inclined forwardly and upwardly at an angle of about ten degrees. This serves the dual purpose of lowering the right-angle-drive gear box 35 and reduce angularity of the universal joints 41 and 42, thereby contributing to a smoother drive. In addition, inclining the axes of the reel plates in the manner described places the axes of the plates in parallel, forwardly-upwardly inclined planes and serves to facilitate entrance of the spring tines 39 between the stripper bars 38 adjacent the rear ends of the bars.

We claim:

1. A ground driven side delivery rake comprising a V-type main frame having support means at the apex and terminal portions thereof, the support means on one terminal portion being a ground wheel, a reel frame having a laterally fixed connection to said main frame adjacent its said apex and a flexible connection to said main frame adjacent the ground wheel supported terminal portion, said reel frame having a reel-type rake thereon, said rake having at least one reel plate, and fixed length driving means between said ground wheel and said reel plate, said driving means comprising the sole stabilizing means against lateral movement of said reel frame about the connection between the reel frame and main frame adjacent the apex.

2. A side delivery rake as claimed in claim 1, in which the flexible connection between the reel frame and the main frame comprises a low rate tension spring.

3. A ground driven side delivery rake comprising a V-type main frame having support means at the apex and terminal portions thereof, the support means on one terminal portion being a ground wheel, a reel frame having a laterally fixed connection to said main frame adjacent its said apex and a flexible connection to said main frame adjacent the ground wheel supported terminal portion, said reel frame having a reel-type rake thereon, said rake having at least one reel plate, and driving means, including a fixed length drive shaft, extending generally laterally of the rake between said ground wheel and said reel plate, said driving means comprising the sole stabilizing means against lateral movement of said reel frame about the connection between the reel frame and main frame adjacent the apex.

4. A ground driven side delivery rake comprising a V-type main frame having support means at the apex and terminal portions thereof, the support means on one terminal portion being a ground wheel, a reel frame having a laterally fixed connection to said main frame adjacent its said apex and a flexible connection to said main frame adjacent the ground wheel supported terminal portion, said reel frame having a reel-type rake thereon, said rake having at least one reel plate, a gear box mounted on the reel frame and driving said reel plate and fixed length driving means between said ground wheel and said gear box, said driving means extending generally laterally of the rake and comprising the sole stabilizing means against lateral movement of said reel frame about the connection between the reel frame and main frame adjacent the apex.

5. A side delivery rake as claimed in claim 4, in which the fixed length driving means comprises a universal joint carried by the ground wheel, a universal joint carried by the gear box, and a fixed length drive shaft connecting the universal joints.

6. A ground driven side delivery rake comprising a V-type main frame having support means at the apex and terminal portions thereof, the support means on one terminal portion being a ground wheel, a reel frame having a laterally fixed connection to said main frame adjacent its said apex and a flexible connection to said main frame adjacent the ground wheel supported terminal portion, said reel frame having a reel-type rake thereon, said rake having at least one reel plate, and driving means between said ground wheel and said reel plate, said driving means including a drive shaft extending generally laterally of the rake and comprising the sole stabilizing means against lateral movement of said reel frame about the connection between the reel frame and main frame adjacent the apex.

References Cited in the file of this patent

UNITED STATES PATENTS

| | | |
|---|---|---|
| 2,403,401 | Rietz | July 2, 1946 |
| 2,497,717 | Bowman | Feb. 14, 1950 |
| 2,635,412 | Schroeppel | Apr. 21, 1953 |
| 2,637,967 | McCandless et al. | May 12, 1953 |
| 2,695,487 | Glienke | Nov. 30, 1954 |
| 2,861,415 | Carlson et al. | Nov. 25, 1958 |